United States Patent
Mogi et al.

(10) Patent No.: US 8,044,121 B2
(45) Date of Patent: Oct. 25, 2011

(54) CEMENT MOLD-MAKING SILICONE RUBBER COMPOSITION

(75) Inventors: Hiroshi Mogi, Annaka (JP); Susumu Sekiguchi, Annaka (JP); Thomas Tupa, Akron, OH (US)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 527 days.

(21) Appl. No.: 12/145,984

(22) Filed: Jun. 25, 2008

(65) Prior Publication Data

US 2009/0326103 A1  Dec. 31, 2009

(51) Int. Cl.
*C08L 83/05* (2006.01)

(52) U.S. Cl. ......... 524/65; 524/268; 524/863; 524/588; 524/492; 524/261; 524/861

(58) Field of Classification Search ............ 524/65, 524/268, 863, 588, 492, 261, 861
See application file for complete search history.

(56) References Cited

U.S. PATENT DOCUMENTS 6,780,919 B2 * 8/2004 Ikeno et al. ............... 524/493

FOREIGN PATENT DOCUMENTS

| JP | 2001-288370 A | | 10/2001 |
|---|---|---|---|
| JP | 2002-338812 A | | 11/2002 |
| JP | 2008031263 A | * | 2/2008 |

* cited by examiner

*Primary Examiner* — Robert D. Harlan

(74) *Attorney, Agent, or Firm* — Birch, Stewart, Kolasch & Birch, LLP

(57) ABSTRACT

A cement mold-making silicone rubber composition is provided comprising (A) 100 parts by weight of a polyorganosiloxane having at least two silicon-bonded monovalent aliphatic unsaturated hydrocarbon groups in a molecule, (B) a polyorganohydrogensiloxane having at least three silicon-bonded hydrogen atoms in a molecule, in such an amount as to provide 0.1-5 silicon-bonded hydrogen atoms per monovalent aliphatic unsaturated hydrocarbon group in component (A), (C) a platinum base compound in such an amount as to provide 1-100 ppm of platinum atoms based on the weight of component (A), (D) 5-60 parts by weight of finely divided silica having a specific surface area of at least 50 m²/g, and (E) 0.1-100 parts by weight of coal ash and/or pozzolan powder.

6 Claims, No Drawings

CEMENT MOLD-MAKING SILICONE RUBBER COMPOSITION

BACKGROUND OF THE INVENTION

This invention relates to a mold-making silicone rubber composition of addition reaction cure type for use in the replication of cement material, and more particularly, to a mold-making silicone rubber composition which cures into a rubber form and is suited for use in operation of making molds requiring a high level of mold release, typically for molding of trial manufacture models or prototype molding, or for use in the replication of cement material for forming pseudo-rocks or the like.

As used herein, the term "mold-making composition" refers to an uncured composition having fluidity in the uncured state which is brought into contact with the entire surface or a surface of a master pattern by such a technique as casting or coating and then cured in that state to form a mold which is used in the subsequent production of replicas using a resin or the like. The term "mold release" refers to not only release of the cured mold from the master pattern, but also release of replicas from the mold.

In the prior art, silicone rubber has been widely used in a variety of fields while taking advantage of its excellent properties including heat resistance, freeze resistance and electrical properties. Especially due to its smooth mold release, the silicone rubber is also used as mold-making composition. While prototype molding is adopted at the stage of commercial product development or product sample manufacture in the fields of electronic equipment, business machines, household appliances, automobile parts and the like, liquid silicone rubber compositions of addition reaction cure type are often used in the prototype molding because of the attractive advantages that they are effective in reducing the cost and requisite time of prototype molding, and especially, in improving the working efficiency. Also in the replication of pseudo-rocks or the like, liquid silicone rubber compositions of addition reaction cure type featuring high strength are used in order to reproduce a complex shape reversal.

When cement is molded for the replication of pseudo-rocks or the like, however, a whitening phenomenon that the cement surface discolors and a water-repelling phenomenon that the surface becomes water repellent occur under the influence of calcium hydroxide contained in the cement. It is desired to overcome these problems.

JP-A 2001-288370 discloses a resin composition comprising 10 to 60% by weight of a resin and 40 to 90% by weight of inorganic particles mainly composed of silicon. Coal ash is added to the resin in the resin composition. JP-A 2002-338812 and U.S. Pat. No. 6,780,919 disclose an addition curing type mold making material. However, these silicone rubbers for cement molding which can control generating of discoloration on the surface of cement were not offered.

DISCLOSURE OF THE INVENTION

An object of the present invention is to provide a cement mold-making silicone rubber composition for making molds which are effective in the replication of cement articles like pseudo-rocks while controlling the discoloring or whitening phenomenon on the cement surface.

The inventors have found that the addition of coal ash and/or pozzolan powder to a mold-making silicone rubber composition is effective in significantly controlling the whitening phenomenon that the surface of cement material being replicated discolors and suppressing the water-repelling phenomenon, that is, in attaining the objects of the invention. The present invention is predicated on this finding.

The present invention provides a cement mold-making silicone rubber composition comprising (A) 100 parts by weight of a polyorganosiloxane having at least two monovalent aliphatic unsaturated hydrocarbon groups each bonded to a silicon atom in a molecule, (B) a polyorganohydrogensiloxane having at least three hydrogen atoms each bonded to a silicon atom in a molecule, in such an amount as to provide 0.1 to 5 silicon-bonded hydrogen atoms per monovalent aliphatic unsaturated hydrocarbon group in component (A), (C) a platinum base compound in such an amount as to provide 1 to 100 ppm of platinum atoms based on the weight of component (A), (D) 5 to 60 parts by weight of finely divided silica having a specific surface area of at least 50 $m^2/g$, and (E) 0.1 to 100 parts by weight of coal ash and/or pozzolan powder.

DESCRIPTION OF THE PREFERRED EMBODIMENT

The polyorganosiloxane used herein as component (A) serves as a base polymer in the mold-making composition of the invention. Component (A) may be any polyorganosiloxane having at least two monovalent aliphatic unsaturated hydrocarbon groups each bonded to a silicon atom in a molecule and capable of forming a network structure through addition reaction.

Examples of monovalent aliphatic unsaturated hydrocarbon groups include alkenyl groups of 2 to 8 carbon atoms such as vinyl, allyl, 1-butenyl, and 1-hexenyl. Of these, vinyl is most advantageous because of ease of synthesis and no negative impact on the flow of the uncured composition and the heat resistance of the cured composition.

Component (A) has other organic groups bonded to silicon atoms, examples of which include alkyl groups such as methyl, ethyl, propyl, butyl, pentyl, hexyl, octyl, decyl and dodecyl; aryl groups such as phenyl; aralkyl groups such as benzyl, 2-phenylethyl, and 2-phenylpropyl; and halo-, cyano- or otherwise substituted hydrocarbon groups such as chloromethyl, chlorophenyl, 2-cyanoethyl, and 3,3,3-trifluoropropyl. Of these, methyl is most preferred because of ease of synthesis and a good balance of properties including mechanical strength and uncured fluidity.

The monovalent aliphatic unsaturated hydrocarbon groups may be located at either one or both of terminal and intermediate positions of the molecular chain of polyorganosiloxane as component (A). In the case of a straight chain, these groups should preferably be attached to at least both ends in order to provide the cured composition with improved mechanical properties.

The siloxane skeleton may be either straight or branched. To improve mechanical properties of the cured composition and to use the composition in making a mold of complex shape like prototype shape, a mixture of a straight polydiorganosiloxane and a branched polyorganosiloxane is preferably used. On use in the casting of an epoxy resin, especially a transparent epoxy resin requiring surface smoothness, the presence of a branched polyorganosiloxane may cause a hardness build-up or impair the smoothness of a silicone rubber mold due to its resinification. When a mixture as mentioned above is used, it is preferred that the polyorganosiloxane as component (A) comprise a mixture of 2 to 40% by weight of a branched polyorganosiloxane consisting of $R_3SiO_{1/2}$ units, $SiO_2$ units, and optionally, $R_2SiO$ units (wherein R is an organic group as defined above, and at least two, preferably at least three R in a molecule are monovalent aliphatic unsaturated hydrocarbon groups) and the balance of a straight polydiorganosiloxane capped at both ends with monovalent aliphatic unsaturated hydrocarbon groups.

It is also preferred that the molar ratio of $R_3SiO_{1/2}$ units to $SiO_2$ units be from 0.6 to 1.1 and the content of $R_2SiO$ units be equal to or less than 20 mol %, especially equal to or less than 10 mol % based on the total (molar) content of $R_3SiO_{1/2}$ units and $SiO_2$ units.

With respect to the degree of polymerization of component (A), it preferably has a viscosity of 500 to 500,000 mm2/s at 25° C., more preferably 1,000 to 100,000 $mm^2/s$ at 25° C. in order that the uncured composition have a good flow and working efficiency and the cured composition have an appropriate elasticity.

It is noted that the viscosity is a value obtained when measurement is made by an Ostwald's viscometer under conditions: 25° C.±2° C./RH 50%±5%.

The polyorganohydrogensiloxane used herein as component (B) functions as a crosslinking agent for component (A) by such a mechanism that hydrosilyl groups (Si—H groups) in its molecule undergo addition reaction to monovalent aliphatic unsaturated hydrocarbon groups in component (A). The polyorganohydrogensiloxane should have at least three silicon-bonded hydrogen atoms which contribute to the addition reaction in order to provide the cured composition with a network structure.

It has organic groups bonded to silicon atom in siloxane units, examples of which are the same as illustrated for the organic groups other than monovalent aliphatic unsaturated hydrocarbon groups in component (A). Inter alia, methyl is most preferred because of ease of synthesis.

The siloxane skeleton of component (B) may be straight, branched or cyclic. A mixture of such skeletons may be used although a straight skeleton is preferred.

The degree of polymerization of component (B) is not particularly limited. A polyorganohydrogensiloxane comprising three or more siloxane units is preferred since a polyorganohydrogensiloxane having two or more hydrogen atoms bonded to a common silicon atom is difficult to synthesize. A polyorganohydrogensiloxane having a viscosity of 15 to 200 $mm^2/s$ at 25° C. is more preferred because it is easy to handle and does not volatilize during shelf storage and upon heating for curing reaction. It is noted that the viscosity is a value obtained when measurement is made by an Ostwald's viscometer under conditions: 25° C.±2° C./RH 50%±5%.

Component (B) is compounded in such an amount as to provide 0.1 to 5, preferably 0.5 to 5, and more preferably 1 to 3 silicon-bonded hydrogen atoms per monovalent aliphatic unsaturated hydrocarbon group in component (A). If the amount is so as to provide a ratio of available hydrogen atoms of less than 0.1, the cure does not proceed to completion so that a mold obtained by curing of the composition remains tacky, detracting from the mold release properties upon formation of a silicone rubber mold from the master pattern, and the mold release properties upon removal of a replica obtained by mold-making from the silicone rubber mold. If the amount is so as to provide a ratio of available hydrogen atoms of more than 5, the composition tends to foam upon curing so that bubbles accumulate at the interface between the master pattern and the silicone rubber mold and the interface between the silicone rubber mold and a replica obtained by mold-making. This not only results in a mold or replica with a degraded surface state, but also renders the silicone rubber mold brittle, leading to a reduction of the number of resin casting cycles, that is, a reduction of mold-making life and a drop of the mold's mechanical strength.

The platinum base compound used herein as component (C) is a catalyst for promoting the addition reaction between monovalent aliphatic unsaturated hydrocarbon groups in component (A) and hydrosilyl groups in component (B). It is advantageous in that it exerts a satisfactory catalysis to cure reaction around room temperature.

Examples of the platinum base compound include chloroplatinic acid, complexes obtained through reaction of chloroplatinic acid with alcohols, platinum-olefin complexes, platinum-vinylsiloxane complexes, platinum-ketone complexes, platinum-aldehyde complexes, and the like.

Inter alia, the reaction products of chloroplatinic acid with alcohols and platinum-vinylsiloxane complexes are preferred from the standpoints of solubility in components (A) and (B) and catalysis.

Component (C) is compounded in such an amount as to provide 1 to 100 parts per million (ppm), and preferably 2 to 50 ppm of platinum atoms, based on the weight of component (A). At less than 1 ppm, the cure rate is slow and the cure does not proceed to completion, so that a silicone rubber mold remains tacky, obstructing the release of a silicone rubber mold from the master pattern and the release of a replica from the silicone rubber mold. In excess of 100 ppm, the cure rate becomes extremely high to detract from workability following compounding of components, and the excess use is uneconomical.

The finely divided silica used herein as component (D) may be any of silicas known in the art as the reinforcing filler for silicone rubber. To this end, the silica should have a specific surface area of at least 50 $m^2/g$, and preferably 100 to 400 $m^2/g$, as measured by the BET adsorption method. Examples of the finely divided silica include fumed silica (dry silica) and precipitated silica (wet silica), with the fumed silica (dry silica) being preferred. More preferred is hydrophobic silica which is prepared by subjecting numerous silanol groups present on surfaces of silica fines to hydrophobic treatment with an organopolysiloxane, organopolysilazane, chlorosilane or alkoxysilane, for covering the surfaces of silica fines with ether-bonded organic groups, typically alkyl groups. This hydrophobic treatment may be performed by mixing the untreated component (D) with the treating agent under heating, prior to compounding with at least one of other components of the composition, or at the same time as the preparation of the composition by mixing the untreated component (D) with other components and the treating agent under heating during preparation of the composition. The silicas may be used alone or in admixture of two or more. Examples of the hydrophobic silica include Aerosil R-812, R-812S, R-972, and R-974 (Degussa), Rheorosil MT-10 (Tokuyama Soda Co., Ltd.), and Nipsil SS series (Nippon Silica Co., Ltd.).

The amount of component (D) added is 5 to 60 parts by weight per 100 parts by weight of component (A). Too small addition amounts fail to achieve a sufficient strength and hardness whereas too large addition amounts provide a rubber composition having too high a viscosity to cast.

Coal ash and/or pozzolan powder used herein as component (E) serves to minimize the influence of calcium hydroxide in cement material to inhibit discoloration and water repellency on the surface of cement material being replicated. The pozzolan powder is not limited to pozzolan, but includes pyroclastic ash in the form of rock and mineral fragments with a diameter equal to or less than 2 mm ejected from the volcanic vent, meta-kaolin obtained by sintering kaolin at 500-800° C., glass sand powder, ground fillers of pyroclastic rocks, class F (calcareous) calcium carbonate, rice hull ash, bauxite and the like. Also included are fly ash and clinker ash in the form of spherical particles generated by combustion of coal in thermal power stations, with the fly ash being preferred.

Examples of coal ash include Finash, Yonden Flyash and Ecoash, all available from Yonden Business Co., Ltd.

The amount of component (E) added is 0.1 to 100 parts by weight per 100 parts by weight of component (A). Too small addition amounts fail to achieve a sufficient anti-discoloration effect whereas too large addition amounts provide a rubber composition having too high a viscosity to cast. The amount of component (E) added is preferably 1 to 50 parts, and more preferably 5 to 30 parts by weight per 100 parts by weight of component (A).

In the mold-making silicone rubber composition of the invention, another component or components may be compounded, depending on a particular object and as long as the advantages of the invention are not compromised. Specifically, cure retarders such as acetylene compounds, diallyl maleate, triallyl isocyanurate, nitrile compounds or organic peroxides may be compounded in order to extend the cure time of the mold-making silicone rubber composition of the invention at room temperature for improving its workability. Further, parting agents, pigments, plasticizers, flame retardants, thixotropic agents, antimicrobial agents, mildew-proofing agents and the like may be compounded, if necessary.

The mold-making silicone rubber composition of the invention may be prepared by intimately kneading components (A) to (E) and optionally other components in a mixer such as a planetary mixer, Shinagawa mixer, universal kneader, kneader or the like. In general, one part comprising component (B) and another part comprising component (C) are prepared and stored separately, and they are intimately mixed together immediately before use. It is possible to store all components within a common container in the presence of a cure retarder.

After intimately mixing and deaerating if stored in separate containers, or directly if stored in a common container, the mold-making composition of the invention is extruded so as to enclose a master pattern, or cast or coated to a surface portion of a master pattern, whereupon it is cured to form a silicone rubber mold. Although the composition will cure at room temperature or under some heating to about 60° C., the cure may be promoted by heating up to 150° C., depending on other conditions. After curing, the rubber mold is removed from the master pattern. Thereafter, a resin compound is cast into the rubber mold, cured at an appropriate temperature for a particular resin, and taken out of the mold, obtaining a replica.

EXAMPLE

Preparation Examples, Examples and Comparative Examples are given below for further illustrating the invention, but not intended to limit the invention thereto. In Examples and Comparative Examples, all parts are by weight, and the viscosity is a measurement at 25° C.

[Preparation of Silicone Compound]

Preparation Example 1-1

In a kneader, 100 parts of a straight polymethylvinylsiloxane capped at both ends with dimethylvinylsilyl groups, composed of dimethylsiloxy units as intermediate units and having a viscosity of 10,000 mm$^2$/s, 40 parts of fumed silica having a specific surface area of 200 m$^2$/g as measured by the BET method, 5 parts of hexamethyldisilazane, and 2.5 parts of water were mixed at room temperature for one hour. Then the internal temperature of the kneader was raised to 160° C. over 60 minutes, and mixing was continued at the temperature for a further 4 hours. This was combined with 10 parts of fly ash FA-20 (Yonden Business Co., Ltd.), yielding a silicone compound #1.

Preparation Example 1-2

In a kneader, 100 parts of a straight polymethylvinylsiloxane capped at both ends with dimethylvinylsilyl groups, composed of dimethylsiloxy units as intermediate units and having a viscosity of 10,000 mm$^2$/s, 40 parts of fumed silica having a specific surface area of 200 m$^2$/g as measured by the BET method, 5 parts of hexamethyldisilazane, and 2.5 parts of water were mixed at room temperature for one hour. Then the internal temperature of the kneader was raised to 160° C. over 60 minutes, and mixing was continued at the temperature for a further 4 hours. This was combined with 20 parts of a filler obtained by grinding pyroclastic rock (Safsil CT450, by CR Minerals Company), yielding a silicone compound #2.

Preparation Example 1-3

In a kneader, 100 parts of a straight polymethylvinylsiloxane capped at both ends with dimethylvinylsilyl groups, composed of dimethylsiloxy units as intermediate units and having a viscosity of 10,000 mm$^2$/s, 40 parts of fumed silica having a specific surface area of 200 m$^2$/g as measured by the BET method, 5 parts of hexamethyldisilazane, and 2.5 parts of water were mixed at room temperature for one hour. Then the internal temperature of the kneader was raised to 160° C. over 60 minutes, and mixing was continued at the temperature for a further 4 hours. This was combined with 20 parts of a glass sand filler (Amorphous Calcium Alumino Silicate LA-7, Vitro Minerals), yielding a silicone compound #3.

Preparation Example 1-4 (Comparison)

In a kneader, 100 parts of a straight polymethylvinylsiloxane capped at both ends with dimethylvinylsilyl groups, composed of dimethylsiloxy units as intermediate units and having a viscosity of 10,000 mm$^2$/s, 40 parts of fumed silica having a specific surface area of 200 m$^2$/g as measured by the BET method, 5 parts of hexamethyldisilazane, and 2.5 parts of water were mixed at room temperature for one hour. Then the internal temperature of the kneader was raised to 160° C. over 60 minutes, and mixing was continued at the temperature for a further 4 hours, yielding a silicone compound #4.

Preparation Example 1-5 (Comparison)

In a kneader, 100 parts of a straight polymethylvinylsiloxane capped at both ends with dimethylvinylsilyl groups, composed of dimethylsiloxy units as intermediate units and having a viscosity of 10,000 mm$^2$/s, 40 parts of fumed silica having a specific surface area of 200 m$^2$/g as measured by the BET method, 5 parts of hexamethyldisilazane, and 2.5 parts of water were mixed at room temperature for one hour. Then the internal temperature of the kneader was raised to 160° C. over 60 minutes, and mixing was continued at the temperature for a further 4 hours. This was combined with 20 parts of a crystalline silica filler (Min-U-Sil-5, U.S. Silica), yielding a silicone compound #5.

[Preparation of Curing Agent]

Preparation Example 2

A curing agent #6 was prepared by intimately mixing 100 parts of a dimethylpolysiloxane capped at both ends of the molecular chain with dimethylvinylsilyl groups and having a viscosity of 1,000 mm$^2$/s (vinyl content: 0.2 wt %), (B) 3 parts of a methylhydrogenpolysiloxane capped at both ends of the molecular chain with trimethylsiloxy groups and having a viscosity of 30 mm$^2$/s (Si—H or silicon-bonded hydrogen content: 1.5 wt %), and (C) 0.3 part of a catalyst in the form of microparticulates of a thermoplastic silicone resin with a softening point of 80-90° C. having a chloroplatinic acid-vinylsiloxane complex dispersed therein (a catalytic amount sufficient to provide 5 ppm of platinum metal in the composition).

Example 1

A silicone rubber composition was prepared by mixing the above-mentioned silicone compound #1 and curing agent #6 in a weight ratio of 100:10. Using the silicone rubber composition, a silicone rubber mold of a concave shape dimensioned 200 mm×200 mm×50 mm was formed. A cement material was cast into the mold cavity and allowed to cure in a thermostatic chamber at 35° C. for 16 hours. The appearance of the cement article thus obtained was visually observed. The cement article was examined for water repellency by dripping tap water onto the cement article surface.

Example 2

The procedure was the same as in Example 1 except that silicone compound #2 was used instead of silicone compound #1. The appearance of the cement article was visually observed.

Example 3

The procedure was the same as in Example 1 except that silicone compound #3 was used instead of silicone compound #1. The appearance of the cement article was visually observed.

Comparative Example 1

The procedure was the same as in Example 1 except that silicone compound #4 was used instead of silicone compound #1. The appearance of the cement article was visually observed.

Comparative Example 2

The procedure was the same as in Example 1 except that silicone compound #5 was used instead of silicone compound #1. The appearance of the cement article was visually observed.

Table 1 tabulates the test results of Examples 1 to 3 and Comparative Examples 1 and 2.

TABLE 1

|  | Appearance | Water repellency |
| --- | --- | --- |
| Example 1 | Not whitened | Not repellent |
| Example 2 | Not whitened | Not repellent |
| Example 3 | Not whitened | Not repellent |
| Comparative Example 1 | Whitened | Repellent |
| Comparative Example 2 | Whitened | Repellent |

[Evaluation]

In Examples wherein coal ash or equivalent was added during preparation of a cement mold-making silicone rubber composition, the cement surface avoided a whitening phenomenon and exhibited no water repellency, indicating that the mold obtained by molding and curing the composition was improved in appearance.

In Comparative Example 1 to which coal ash was not added or Comparative Example 2 to which a filler without pozzolanic characteristics was added, the cement surface gave rise to a whitening phenomenon and had a poor appearance.

By virtue of coal ash and/or pozzolan powder added, the cement mold-making silicone rubber composition of the invention is effective for preventing a whitening phenomenon on a cement material being replicated and improving the appearance of a cement material being replicated.

The invention claimed is:

1. A cement mold formed by casting or coating a silicone rubber composition onto a surface portion of a master pattern and removing the mold from the master pattern,
    said silicone rubber composition comprising
    (A) 100 parts by weight of a polyorganosiloxane having at least two monovalent aliphatic unsaturated hydrocarbon groups each bonded to a silicon atom in a molecule,
    (B) a polyorganohydrogensiloxane having at least three hydrogen atoms each bonded to a silicon atom in a molecule, in such an amount as to provide 0.1 to 5 silicon-bonded hydrogen atoms per monovalent aliphatic unsaturated hydrocarbon group in component (A),
    (C) a platinum base compound in such an amount as to provide 1 to 100 ppm of platinum atoms based on the weight of component (A),
    (D) 5 to 60 parts by weight of finely divided silica having a specific surface area of at least 50 m$^2$/g, and
    (E) 0.1 to 100 parts by weight of coal ash and/or pozzolan powder.

2. A method of molding a cement material comprising casting the cement material into the cement mold of claim 1.

3. A cement mold formed by casting or coating a silicone rubber composition onto a surface portion of a master pattern and removing the mold from the master pattern,
    said silicone rubber composition comprising
    (A) 100 parts by weight of a polyorganosiloxane having at least two monovalent aliphatic unsaturated hydrocarbon groups each bonded to a silicon atom in a molecule,
    (B) a polyorganohydrogensiloxane having at least three hydrogen atoms each bonded to a silicon atom in a molecule, in such an amount as to provide 0.1 to 5 silicon-bonded hydrogen atoms per monovalent aliphatic unsaturated hydrocarbon group in component (A),
    (C) a platinum base compound in such an amount as to provide 1 to 100 ppm of platinum atoms based on the weight of component (A),
    (D) 5 to 60 parts by weight of finely divided silica having a specific surface area of at least 50 m$^2$/g, and (E) 5 to 30 parts by weight of coal ash and/or pozzolan powder.

4. A cement mold formed by extruding a silicone rubber composition onto a master pattern so as to enclose the master pattern and removing the mold from the master pattern, said silicone rubber composition comprising
- (A) 100 parts by weight of a polyorganosiloxane having at least two monovalent aliphatic unsaturated hydrocarbon groups each bonded to a silicon atom in a molecule,
- (B) a polyorganohydrogensiloxane having at least three hydrogen atoms each bonded to a silicon atom in a molecule, in such an amount as to provide 0.1 to 5 silicon-bonded hydrogen atoms per monovalent aliphatic unsaturated hydrocarbon group in component (A),
- (C) a platinum base compound in such an amount as to provide 1 to 100 ppm of platinum atoms based on the weight of component (A),
- (D) 5 to 60 parts by weight of finely divided silica having a specific surface area of at least 50 $m^2/g$, and
- (E) 5 to 30 parts by weight of coal ash and/or pozzolan powder.

5. A method of molding a cement material comprising casting the cement material into the cement mold of claim 3.

6. A method of molding a cement material comprising casting the cement material into the cement mold of claim 4.

* * * * *